United States Patent
Boystun

(10) Patent No.: US 7,716,716 B1
(45) Date of Patent: May 11, 2010

(54) METHOD AND SYSTEM FOR ARCHITECTING ENTERPRISE DATA SECURITY

(75) Inventor: Kenneth C. Boystun, Carrollton, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 1407 days.

(21) Appl. No.: 10/875,539

(22) Filed: Jun. 24, 2004

(51) Int. Cl.
*G06F 17/00* (2006.01)

(52) U.S. Cl. .......................................................... 726/1
(58) Field of Classification Search ...................... 726/1; 705/64, 75
See application file for complete search history.

(56) References Cited

U.S. PATENT DOCUMENTS

| | | | | |
|---|---|---|---|---|
| 6,785,721 | B1 * | 8/2004 | Immerman et al. .......... | 709/220 |
| 7,257,834 | B1 * | 8/2007 | Boydstun et al. ............ | 726/1 |
| 7,263,717 | B1 * | 8/2007 | Boydstun et al. ............ | 726/4 |
| 7,334,254 | B1 * | 2/2008 | Boydstun et al. ............ | 726/2 |
| 2004/0054896 | A1 * | 3/2004 | Himmel et al. ............. | 713/167 |
| 2004/0111643 | A1 * | 6/2004 | Farmer ..................... | 713/201 |
| 2005/0028006 | A1 * | 2/2005 | Leser et al. ................ | 713/200 |
| 2005/0044409 | A1 * | 2/2005 | Betz et al. ................. | 713/201 |
| 2005/0182957 | A1 * | 8/2005 | Della-Libera et al. ....... | 713/200 |
| 2005/0251852 | A1 * | 11/2005 | Patrick et al. .............. | 726/1 |
| 2007/0143824 | A1 * | 6/2007 | Shahbazi ................... | 726/1 |

* cited by examiner

*Primary Examiner*—Jung Kim
*Assistant Examiner*—Samson B Lemma

(57) ABSTRACT

A method for architecting enterprise data security solutions for an enterprise having multiple levels is provided. The method includes analyzing the enterprise levels and a workflow related to the plurality of levels and analyzing a data element having a security requirement. The method includes providing a reference model including the data element. The reference model associates the data element and the security requirement with the workflow. The method includes determining a vertical component of the data element using the reference model. The vertical component identifies the security requirement for the data element based on the workflow for each of the plurality of levels of the enterprise. The method includes identifying a technical component using the reference model and the vertical component. The technical component is operable to provide the security requirement of the data element for the workflow across each of the plurality of levels of the enterprise.

24 Claims, 1 Drawing Sheet

METHOD AND SYSTEM FOR ARCHITECTING ENTERPRISE DATA SECURITY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure relates to a method and system for securing data, and more particularly, but not by way of limitation, to a method and system for architecting enterprise data security to identify enterprise components.

BACKGROUND

Securing data is an important aspect of any enterprise or application. The challenges in securing data in a particular system continue to change however. In a given environment, it may be necessary to secure all data at multiple levels of a particular application, whereas in other environments, it may be necessary to secure only particular data throughout all levels of the application. Thus, there exists a need for security implementations that provide all of the necessary security for a given system, and yet maintain sufficient flexibility and efficiency so that the security is implemented only on data requiring such security.

SUMMARY

In one embodiment, the present disclosure provides a method for architecting enterprise data security solutions for an enterprise having multiple levels. The method includes analyzing an enterprise having a plurality of levels and a workflow related to the plurality of levels. The method includes analyzing a data element having a security requirement. The method includes providing a reference model including the data element. The reference model associates the data element and the security requirement with the workflow. The method includes determining a vertical component of the data element using the reference model. The vertical component identifies the security requirement for the data element based on the workflow for each of the plurality of levels of the enterprise. The method includes identifying a technical component using the reference model and the vertical component. The technical component is operable to provide the security requirement of the data element for the workflow across each of the plurality of levels of the enterprise.

In another embodiment, a method of securing data across multiple levels of an enterprise is provided. The method includes providing an enterprise having a plurality of horizontal levels and identifying a data element to be secured. The data element to extend through the plurality of horizontal levels of the enterprise. The extension of the data element through the plurality of horizontal levels of the enterprise defined by a workflow. The method includes providing a reference model including a data type and a security requirement for the data element. The security requirement related to securing the data element across the plurality of the horizontal levels of the enterprise. The reference model also associates the data element with the workflow. The method also includes using the workflow and the security requirement associated with the data element provided by the reference model to identify a component operable to secure the data element across the plurality of horizontal levels of the enterprise as provided by the reference model.

In another embodiment, a method for architecting enterprise data security is provided. The method includes identifying a first data element, a second data element, and a third data element. The method includes identifying a first and second workflow. The first workflow related to the first data element across a plurality of levels of an enterprise and the second workflow related to the second data element across at least some of the plurality of levels of the enterprise. The method includes providing a reference model including a first security requirement for the first data element and a second security requirement for the second data element. The first and second security requirements related to securing the first and second data elements across the plurality of the levels of the enterprise. The method also includes determining a vertical component of the first and second data elements using the reference model. The vertical component identifies the first and second security requirements for the first and second data elements based on the first and second workflows, respectively, for each of the plurality of levels of the enterprise. The method further includes using the reference model and the vertical components of the first and second data elements to identify one or more components. The components are operable to provide the first and second data elements according to the first and second security requirements, respectively, at the plurality of levels of the enterprise. The one or more components are also operable to provide the third data element in a native state.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE SEVERAL EMBODIMENTS

It should be understood at the outset that although an exemplary implementation of one embodiment of the presently claimed system and method is illustrated below, the present system and method may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents. Moreover, those skilled in the art will appreciate that many of the elements and functional steps described herein can be implemented by any number of means including, discrete components, or processors executing machine code, or any combination thereof. Furthermore, it is understood that the components and steps described herein can be substituted for, or omitted altogether in accordance with known customs and practices and the knowledge of those skilled in the art.

An enterprise may be thought of as having multiple horizontal levels where data transactions occur. Enterprise architects view data security on a level-by-level basis and select solutions for securing data at each of the levels of the enterprise. The architect determines the amount or type of data security needed at a specific level of the enterprise and then selects a component or application capable of providing the desired security for the data at that particular level. Frequently, this strategy results in multiple components, each at a different level of the enterprise, each providing security for the same element of data. Also, the components may not discriminate which data it secures. The result being that all the data at a particular level of the enterprise is secured. It can be seen that this technique may be inefficient and costly.

The present disclosure provides for identifying the data, which may be one or more data elements to be secured, and the workflow or transactions involving the data at multiple levels of the enterprise. This provides the architect with a vertical view of the data to be secured based on the workflow involving the data throughout various levels of the enterprise. This vertical view illuminates the data as it passes through the enterprise levels or tiers and may identify, for example, enterprise applications or systems operating or invoked between levels, not only those operating at a particular level. This view of the data and identification of these additional applications and systems will generally provide a significantly different set of requirements for the solutions needed to provide data security than requirements for securing data at a single enterprise level. The architect may then identify solutions or components that provide the required security for only the desired data, but across the multiple levels of the enterprise.

Figure 1:
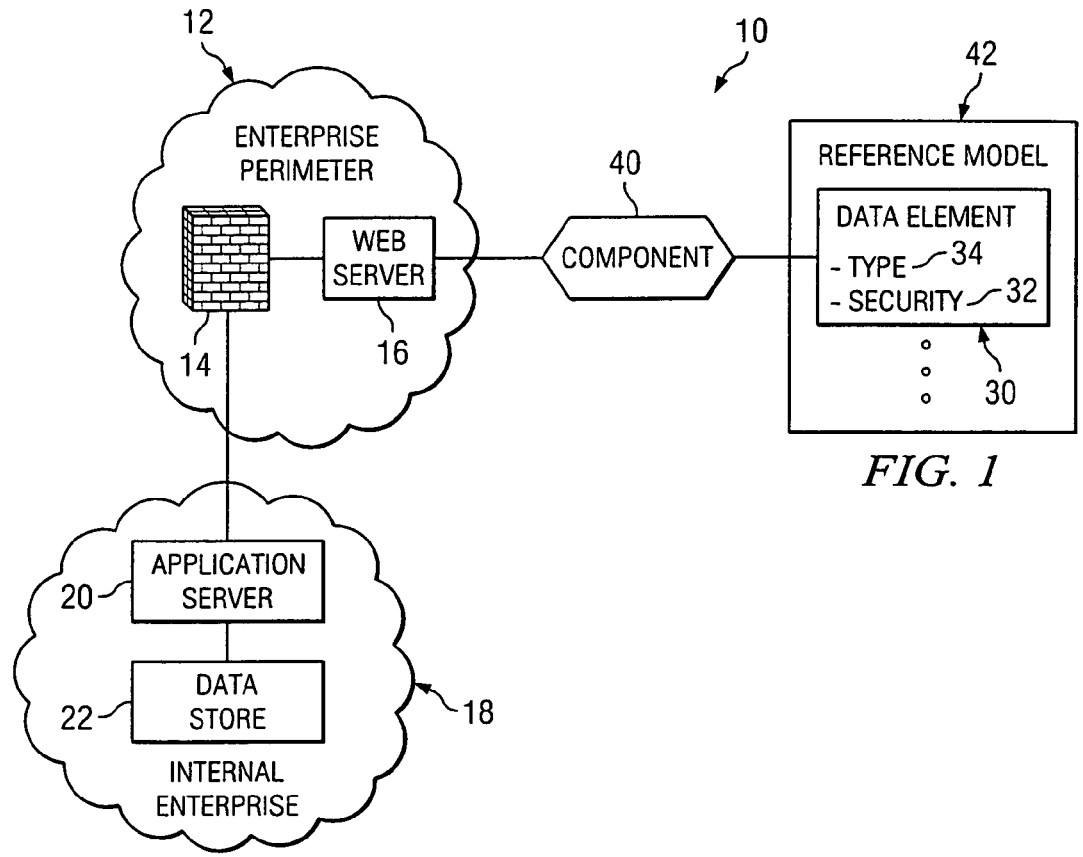
FIG. 1 is a diagram, according an embodiment of the present disclosure, of an enterprise and a reference model having a data element with a component shown for providing the data element to the enterprise according to the reference model.

FIG. 1 illustrates an exemplary enterprise 10 having a perimeter 12 which may include a firewall 14 and a web server 16. The enterprise 10 also includes an internal enterprise 18 which may include one or more application servers 20 in communication with one or more data stores 22. The firewall 14 may be a standard firewall system or software operable for securing communications between the enterprise and, for example, the Internet. The firewall 14 may be coupled or communicate with the web server 16, which may include or maintain one or more web based applications of the enterprise 10. The web servers 16 are operable for managing web-based enterprise applications that function, for example, to access data stored in the data stores 22 of the internal enterprise 18. The firewall 14 also communicates, such as via an internal network with the one or more application servers 20. The application servers 20 and data stores 22 may include applications, systems, and data that support operations of the business.

The perimeter 12 and internal enterprise 18, as well as the firewall 14, web server 16, one or more application servers 20, and one or more data stores 22 may be viewed or thought of as one or more levels of the enterprise 10 between which workflow, such as transaction flows, take place. The workflow or transaction flow, which may include data (corresponding to system events) related to these transactions, may be analyzed, viewed, or modeled as occurring at or between the various levels, such as communicating data between the firewall 14 and the web server 16, as well occurring at a particular level within the enterprise 10, such as storing data at the data store 22.

Data, such as a data element 30 may be involved in various transactions at or between enterprise 10 levels and may require certain levels of security 32 for business and/or other reasons. The security 32 may define, for example, encryption levels and password protection depending upon the status of the data at each level of the enterprise 10, such as whether it is stored or communicated in an encrypted or unencrypted state. The security 32 may also depend on the type 34 of the data element 30. The type 34 may identify the specific type or classification of data, such as name or social security number, or may be a generic category such as privacy information, personal information, health related information, or other categories.

Typically, security of information is relative to a particular location within the enterprise, such as between or at a particular level of the enterprise 10. Specifically, security 32 determinations with regard to data elements 30, such as social security numbers at the web server level 16, are generally made only with regard to that level. Security solutions for the enterprise 10, such as security applications, are frequently identified, selected, integrated, and used based on the specific application's ability to provide the necessary security for the particular type of data at that specific level of the enterprise 10. Solutions selected in this manner, such as a secure socket layer (SSL), enable the firewall 14 to successfully provide all information over an encrypted connection. However, this may be inefficient since not all the data at or between the enterprise levels may need this amount of security.

According to one embodiment, the present invention is directed to a method for architecting enterprise data security using a workflow or transaction centric approach to selecting applications or solutions to provide the desired security 32 for the data element 30 across and/or at various levels within the enterprise 10. Using the approach provided according to the present embodiment, a component 40 may be identified that is operable for providing the appropriate security 32 for the data element 30 at various levels within the enterprise 10 without the need for the component 40 to secure, for example, all information between or at specific levels within the enterprise to achieve the desired security for only the data element 30.

According to one embodiment, a reference model 42 is provided which may define one or more data elements 30 and include definitions of the types 34 of these data elements 30. The reference model 42 may include workflow or transaction related information with regard to each of the data elements 30. For example, the reference model 42 may include information relevant to the workflow and the association or relationship of the workflow to the security 32 required for the data element 30 at or between each level of the enterprise 10. In one embodiment, the types 34 may include digital rights management, identity management, as well as personal information such as social security numbers, financial information, such as credit cards and bank account information, and other personal or private information whether for individuals, corporations or other entities.

The reference model 42 may also include security 32 requirements which may identify, such as previously described, specifications or objectives, for example, of minimum security requirements for data as the data is passed from different levels or applications within the enterprise 10. For example, the security 32 may specify that a particular item of data, such as the data element 30, be kept secure and that access to such data should be restricted to authorized personnel only. Furthermore, the security 32 may prescribe compliance with legislation, such as limitations on sharing social security numbers based on state regulations, or limitations on sharing health care related information based on federal legislation. These legislative restrictions may be in addition to or separate from a base level security that is generally provided by the enterprise 10. Such security requirements may be identified and promulgated internally by the enterprise 10, or may be issued by a number of sources, such as legislation, administrative bodies, private individuals or corporations, or required by individual customers.

The vertical view of the data and workflow centric analysis for selection of component 40 may identify various aspects of the workflow, and the relationship of the security 32 for the relevant data element 30. This information may be maintained by the reference model 42 and may include whether the information is communicated, displayed, stored, processed, and whether the information or data will otherwise be received or passed to individuals within or outside of the organization or enterprise 10. The different applications, components, or levels that process the relevant data and the relationship to business processes, applications or other systems that will be affected by any implementation to achieve compliance with the security 32 requirements should also be recognized. The reference model 42 may be created based on, and may include, the above described requirements, objectives, and information gathered by monitoring the workflow of the relevant data, such as data elements 30. The reference model 42 may include the definitions of the security 32 related requirements, which may be used to identify and achieve the business requirements at each level of the workflow.

By using the reference model 42 to identify the vertical flow of the data through levels of the enterprise 10, components may be selected that achieve all or most of the security 32 requirements without unnecessarily securing other data. Further by focusing on such a workflow related analysis of enterprise data security for selection of component 40, the appropriate component 40 may be more readily identified, selected, and integrated with a higher degree of successful implementation.

According to one embodiment, only the relevant data, such as data element 30, is identified and secured at each of the various layers of the enterprise 10, as necessary. Also, the present disclosure may be used for architecting data security for multiple data elements 30, one or more having different enterprise 10 workflows. In this instance, the present disclosure provides the architect with sufficient detail regarding the levels of the enterprise 10 and associated workflow to select components 40 that integrate and cooperate more seamlessly than security components architected individually.

Figure 2:
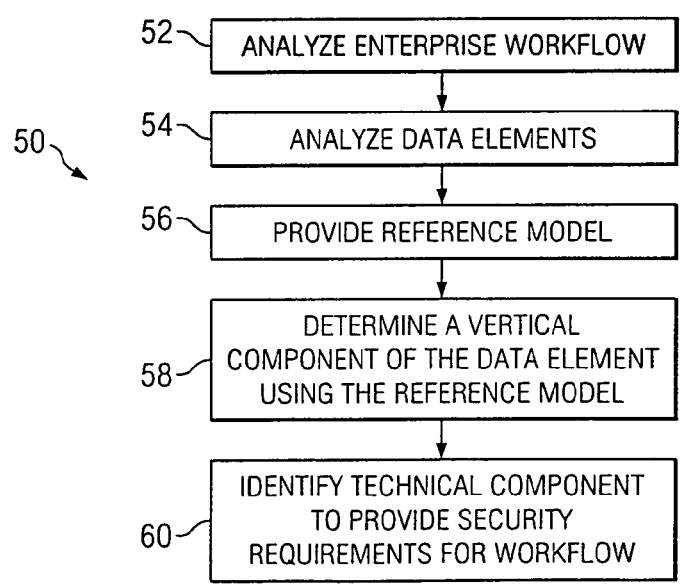
FIG. 2 is a flow chart illustrating an embodiment of a method for architecting enterprise data security.

FIG. 2 illustrates a method 50 for architecting enterprise data security. The method includes, at a block 52, analyzing the enterprise 10, which includes a plurality of levels of the enterprise 10 and a workflow of data involved in transactions at the plurality of levels. At a block 54, the method includes analyzing a data element, such as the data element 30, which includes a security requirement, such as the security 32. At a block 56, the method includes providing a reference model, such as the reference model 42 which includes the data element 30 defined using at least a portion of the security 32 and at least a portion of the workflow related to the data element 30.

At a block 58, a vertical component of the data element 30 is determined using the reference model 42. The vertical component identifies the security 32 required for the data element 30 based on the workflow for each of the plurality of levels of the enterprise 10. At a block 60, the method includes identifying a technical component operable to provide the security 32 for the data element 30. The technical component may be identified based on the present method 50 by using at least the portion of the workflow defined in the reference model 42 and the security 32 required for the data element 30. This analysis is operable to identify the security, communications, applications, and systems operating between each level of the enterprise 10. The analysis is further operable to select one or more components 40 capable of providing the desired security for the one or more data elements 30 across these levels of the enterprise 10.

It will be appreciated that this workflow centered functionality differs from an isolated view of a specific level of the enterprise 10 and related data security. An isolated view promotes providing data security at a fixed or static level or location within the enterprise 10. Whereas the present embodiment provides for selection of the technical component 40 based on an analysis of the workflow between one or more of the enterprise levels, such as between a first and a second level of the enterprise, or between several or all of the levels within the enterprise.

Although only a single data element 30 has been discussed, it will be appreciated that the present disclosure may be used for selection of one or more components 40 to secure a plurality of related or unrelated data elements 30, whether or not the data elements have similar security 32 requirements. Further, the selected component 40 may provide the security 32 for the data element 30 during communication between levels within the enterprise 10, as well as at a particular level within the enterprise 10, such as securely storing data at one or more of the levels within the enterprise 10.

It will be appreciated that a first data element may be secured by the component 40, while the selected component 40 may be operable to provide a second data element not requiring any security 32 in a native state. The native state of the data element may be a nonsecure, unencrypted state such that users of the enterprise or others may readily ascertain the content of the second data element.

While several embodiments have been provided in the present disclosure, it should be understood that the presently described system and method may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by on skilled in the art and could be made without departing from the spirit and scope disclosed herein.

What is claimed is:

1. A method for architecting enterprise data security solutions for an enterprise having multiple levels, comprising:
   identifying by a processor a data element and an associated security requirement;
   determining by a processor an enterprise workflow for the data element across a plurality of enterprise levels wherein at least two of the plurality of enterprise levels comprise different machines;
   creating by a processor a reference model for the data element, wherein the reference model associates the data element and the security requirement with the enterprise workflow wherein the reference model includes information about a relationship of the workflow to the security requirement for the data element and of a relationship of the security requirement for the data element to each of the plurality of enterprise levels;
   determining by a processor a vertical component of the data element using the reference model, the vertical component identifying the security requirement for the data element for each of the plurality of enterprise levels in the enterprise workflow; and
   identifying by a processor a technical component using the reference model and the vertical component, the technical component configured to provide the security requirement of the data element for at least two of the plurality of levels of the enterprise in the enterprise workflow, wherein at least one other data element remains unaffected by operation of the technical component to implement the security requirement.

2. The method of claim 1, further comprising selecting the technical component for use by the enterprise, and wherein the technical component is selected substantially based on a workflow centered functionality of the technical component to provide the security requirement of the data element.

3. The method of claim 1, wherein the identifying the technical component is based on a workflow centric analysis of providing the security requirement for the data element.

4. The method of claim 1, further comprising selecting the technical component for use by the enterprise, and wherein the selection of the technical component is based on an analysis of the enterprise workflow between one or more of the levels of the enterprise.

5. The method of claim 1, wherein the at least portion of the enterprise workflow is defined as the enterprise workflow related to the data element and the security requirement for the data element between at least a first and second levels of the enterprise.

6. The method of claim 1, wherein the at least portion of the enterprise workflow is defined as the enterprise workflow related to providing the security requirement for the data elements between each of the plurality of enterprise levels between which the data element is provided.

7. The method of claim 1, wherein the enterprise workflow is defined as transactions related to the data element.

8. The method of claim 1, wherein the technical component is configured to secure the data element as required by the security requirement, and wherein the security requirement requires secure storage of the data element at one or more of the plurality of enterprise levels.

9. The method of claim 8, wherein the technical component promotes storage of other data elements but securely stores only the data element having the security requirement, and wherein the security requirement is defined as a privacy related risk.

10. The method of claim 1, wherein the technical component is configured to secure the data element as required by the security requirement, and wherein the security requirement requires secure communication of the data element between at least a first and second levels of the enterprise.

11. The method of claim 10, wherein the technical component promotes communication of other data elements between the first and second levels of the enterprise, but securely communicates only the data element having the security requirement.

12. A method for architecting enterprise data security, comprising:
   identifying by a processor a first data element, a second data element, and a third data element;
   identifying by a processor a first and second workflow, the first workflow related to the first data element across a plurality of levels of an enterprise and the second workflow related to the second data element across at least some of the plurality of levels of the enterprise wherein at least two of the plurality of enterprise levels comprise different machines;
   providing by a processor a reference model including a first security requirement for the first data element and a second security requirement for the second data element, the first and second security requirements related to securing the first and second data elements for at least two of the plurality of the levels of the enterprise wherein the reference model includes information about a relationship of the first workflow to the first security requirement for the first data element and information about a relationship of the second workflow to the second security requirement for the second data element;
   determining by a processor a vertical component of the first and second data elements using the reference model, the vertical component identifying the first and second security requirements for the first and second data elements based on the first and second workflows, respectively, for each of the plurality of levels of the enterprise; and
   using the reference model and the vertical components of the first and second data element to identify one or more components configured to provide the first and second data elements according to the first and second security requirements, respectively, for at least two of the plurality of levels of the enterprise, the one or more components further configured to provide the third data element in a native state.

13. The method of claim 12, wherein the native state of the third data element is further defined as a non-secure state.

14. The method of claim 12, wherein the component is configured to encrypt the first data element and further configured to maintain the third data element in a non-encrypted state for providing the first and third data elements across the plurality of levels of the enterprise.

15. The method of claim 14, wherein providing the first and third data elements across the plurality of levels of the enterprise is further defined as storing the first and third data elements at a storage level of the enterprise.

16. The method of claim 14, wherein providing the first and third data elements across the plurality of levels of the enterprise is further defined as communicating the first and third data elements between a first and a second level within the enterprise.

17. A system for architecting enterprise data security solutions for an enterprise having multiple levels, comprising:

an application stored as a set of computer readable instructions in a computer readable storage media and executable by a processor;

a data store in a computer readable storage media;

a data element residing on the data store used by the application;

a reference model stored in a computer readable storage media and comprising an association of a data element type and a data element security requirement with a defined enterprise workflow of the data element across a plurality of enterprise levels wherein the reference model includes information about a relationship of the workflow to the data element security requirement;

a vertical aggregation unit stored as a set of computer readable instructions in a computer readable storage media and executable by a processor that determines a vertical component of the data element using the reference model, wherein the vertical component identifies the security requirement for the data element for each of the plurality of enterprise levels in the enterprise workflow wherein at least two of the plurality of enterprise levels comprise separate machines; and an identifying unit stored as a set of computer readable instructions in a computer readable storage media and executable by a processor that identifies a technical component using the reference model wherein the technical component is a component operable to provide the security requirement of the data element for the defined enterprise workflow.

18. The system of claim 17, wherein the defined enterprise workflow is further defined as the defined enterprise workflow relating the data element and the data element security requirement between at least a first level and a second level of the enterprise.

19. The system of claim 18, wherein the first level comprises the application.

20. The system of claim 18, wherein the second level comprises one of a web server, an application server, and a firewall.

21. The system of claim 17, wherein the defined enterprise workflow is further defined as transactions related to the data element.

22. The system of claim 17, wherein the technical component is configured to secure the data element as required by the security requirement and wherein the security requirement requires storage of the data element at one or more of a plurality of levels within the enterprise.

23. The system of claim 22, wherein the technical component promotes storage of other data elements while only imposing the security requirement on the data element having the security requirement.

24. The system of claim 23, wherein the security requirement is defined as a privacy related risk.

* * * * *